United States Patent [19]

Coste et al.

[11] Patent Number: 5,747,755

[45] Date of Patent: May 5, 1998

[54] ELEVATOR POSITION COMPENSATION SYSTEM

[75] Inventors: Steven D. Coste, Berlin; Jeff Izard, Bolton, both of Conn.

[73] Assignee: Otis Elevator Company, Farmington, Conn.

[21] Appl. No.: 575,797

[22] Filed: Dec. 22, 1995

[51] Int. Cl.$^6$ .................. B66B 1/34; B66B 3/00
[52] U.S. Cl. .................. 187/394; 187/93
[58] Field of Search .................. 187/394, 393, 187/390, 291, 293

[56] References Cited

U.S. PATENT DOCUMENTS

| | | | |
|---|---|---|---|
| 3,885,209 | 5/1975 | Lazarus | 318/692 |
| 4,041,483 | 8/1977 | Groff | 340/347 |
| 4,323,142 | 4/1982 | Bittar | 187/29 R |
| 4,354,576 | 10/1982 | Kajiyama | 187/29 R |
| 4,384,275 | 5/1983 | Masel | 340/347 |
| 4,493,399 | 1/1985 | Kajiyama | 187/29 R |
| 4,497,391 | 2/1985 | Mendelsohn | 187/29 R |
| 4,627,518 | 12/1986 | Meguerdichian | 187/29 R |
| 4,751,984 | 6/1988 | Williams | 187/116 |
| 4,864,208 | 9/1989 | Schroder | 318/603 |
| 4,880,082 | 11/1989 | Kahkipuro et al. | 187/134 |
| 4,887,695 | 12/1989 | Kindler | 187/116 |
| 4,940,117 | 7/1990 | Ovaska | 187/101 |
| 5,024,296 | 6/1991 | Kameli | 187/132 |
| 5,202,540 | 4/1993 | Auer | 187/101 |
| 5,274,203 | 12/1993 | Skalski | 187/134 |
| 5,306,882 | 4/1994 | Gerwing | 187/134 |

*Primary Examiner*—Robert Nappi

[57] ABSTRACT

An elevator car position compensator includes a compensated position signal generator which, via a closed-loop feed-back arrangement, adjusts a true position signal by using a signal related to dynamic slip and stretch of the hoist ropes.

2 Claims, 4 Drawing Sheets

$$POSITION_n =$$
$$(TRUE\ ENCODER\ POSITION)_n - (COMMANDED\ ACCELERATION)_{n-1} \left[ \left( \frac{K_t - K_b}{RISE} \right)(POSITION_{n-1}) + K_b \right]$$

POSITION$_n$ =
(TRUE ENCODER POSITION)$_n$ − (COMMANDED ACCELERATION)$_{n-1}$ $\left[\left(\dfrac{K_t - K_b}{RISE}\right)(POSITION_{n-1}) + K_b\right]$

WITHOUT COMPENSATION

WITH COMPENSATION

ELEVATOR POSITION COMPENSATION SYSTEM

TECHNICAL FIELD

The present invention relates to elevator systems and, more particularly, to a system for determining the location of an elevator car in an elevator system.

BACKGROUND ART

In an elevator system, one or more cars travel up and down the length of the elevator run in a hoistway, carry passengers and move between the floors of the building.

In order to stop smoothly and level with the landing at each floor, it is important to know the precise location of the car at all times. To provide this information to the elevator controller system, a digital readout device known as a Primary Position Transducer or "PPT" is typically used. The PPT, together with well-known associated electronics, generates a position signal which is used by the elevator controller system to control motion of the elevator car.

For mid- and low-rise installations, a reader device mounted on the car and a vertical steel tape that runs the length of the hoistway are used to establish the car's position. Either steel vanes and/or magnets are mounted on the tape at precise locations with respect to the floor level of each landing.

For an example of a prior art position transducer system used with an elevator system, note assignee's U.S. Pat. No. 4,384,275 entitled "High Resolution and Wide Range Shaft Position Transducer Systems" of Masel et al issued May 17, 1983, the disclosure of which is incorporated in its entirety herein by reference. Some additional patents which may be of interest are U.S. Pat. No. 4,041,483 entitled "Absolute Incremental Hybrid Shaft Position Encoder" of Groff issued Aug. 9, 1977; and U.S. Pat. No. 3,885,209 entitled "Two Speed Control System" of Lazarus issued May 20, 1975.

A "Smart" Primary Position Transducer (SPPT) System is taught, for example, in U.S. Pat. No. 5,274,203, Dec. 28, 1993, Skalski et al, which is hereby incorporated in its entirety by reference. In the '203 Patent, a computerbased (e.g., microprocessor-based) elevator system generates a primary position signal which is used by the elevator controller to ascertain car position within the hoistway, and to control motion of the elevator car at or near a landing.

Some other known automatic positioning elevator systems are more suited for high-rise (e.g., greater than 10 floors) applications. Such other systems or techniques use shaft encoder feedback to derive the elevator cab's car's position from the driving machine (e.g., motor) shaft, and also use discrete points (e.g., vanes) disposed vertically throughout the hoistway as benchmark reference positions. Various types of these systems are manufactured and sold by the Otis Elevator Company as 311 vc and 411 vc elevators systems. See also, for example, U.S. Pat. No. 4,354,576 and 4,493,399, which are both hereby incorporated in their entireties by reference.

Typically, there exists a problem of adequately determining the cab's position when this other known control technique is employed in high rise elevator applications. This problem manifests itself as an increase in the amounts of "slip" and "stretch" exhibited by the hoist ropes, when the ropes undergo acceleration and deceleration during the normal elevator motion control processes. This increase in slip and stretch causes this type of control to become unstable such that the control system fails to land the elevator adequately when subjected to the standard performance constraints for high-rise applications. It is for this reason that this type of control system is generally not optimum for high rise applications, and a direct mechanical connection to the cab (e.g., by means of a metal tape) is usually used for the determination of cab position, at a significant increase in equipment cost. See, for example, the '275 or '203 patent.

The present invention is an arrangement and/or method for allowing an efficient and reliable application of this other control technique to high rise applications (e.g., greater than approx. 10 floors).

The inventors believe that the present invention results in reduced controller system cost and in some realized serviceability advantages.

DISCLOSURE OF INVENTION

Hoist ropes employed in elevator systems exhibit at least two phenomena in relation to the driving machine's shaft, in each of two different modes. In the elevator art, the two phenomena are generally referred to as "slip" and "stretch", and the two different modes in which these phenomena are manifested are referred to as "static" and "dynamic".

The method and arrangement according to the present invention combines the slip and stretch phenomena together, but then separates the static "slip and stretch" phenomenon from the dynamic "slip and stretch" phenomenon. According to the present invention, during initial installation of the elevator control system's position reference table, the elevator cab (car) is caused to run at a very low speed using a very low rate of acceleration throughout the entire hoistway. This operation is done in a well-known prescribed manner under a known prescribed set of conditions, so as to collect a number of driving machine shaft encoder pulses that have occurred from a pre-defined absolute reference position to the positions in the hoistway where these reference points are detected by sensors mounted to the cab. The number of pulses from this absolute reference position is then collected by the control system for each of these reference points, and tabulated to form the control system's position reference table. Thus, in a well-known manner, the static "slip and stretch" characteristics of the hoistway have been learned by the elevator control system. Furthermore, these reference points may serve a dual purpose so as also to define passenger transfer stations (or building floors or landings) throughout the hoistway.

During normal motion control operations, so as to meet certain performance criteria, the elevator is commanded to undergo much higher speeds of travel and rates of acceleration (positive and/or negative) than those imposed during the "learned" process. The most significant deviation from the "learned" conditions appears during acceleration. Therefore, for high rise applications, according to the present invention, the dynamic "slip and stretch" phenomenon is considered and is utilized as hereinafter described whenever the cab is to be accelerated. The dynamic "slip and stretch" is predicted by the present invention, using the elevator's general position in the hoistway together with the commanded acceleration (or stimulus signal) to estimate the degree of this dynamic phenomenon. The shaft encoder pulse count (or true encoder position) is then compensated (or modified) accordingly in an attempt to neutralize or to at least minimize the dynamic phenomenon component.

An elevator car position compensation arrangement of the present invention includes a car coupled to a motor by means of ropes; means for controlling the motor; uncompensated signal generating means for generating an uncompensated car position signal, and a compensated signal generating means for generating a compensated car position signal; the compensated signal generating means includes instructions and data for adjusting the uncompensated car position signal responsive to a dynamic slip and stretch of the ropes.

It is a principal object of the present invention to position a car accurately within a hoistway.

It is a further object of the present invention to position an elevator car within a hoistway by utilizing the dynamic "slip and stretch" characteristics of hoistway ropes.

It is still a further object of the present invention to reduce overall cost of elevator systems and, particularly, elevator systems for high-rise applications.

Further and still other objects of the present invention will become more readily apparent when the following detailed description is taken in conjunction with the accompanying drawing, in which:

according to the preferred embodiment of the present invention.

Figure 5A:
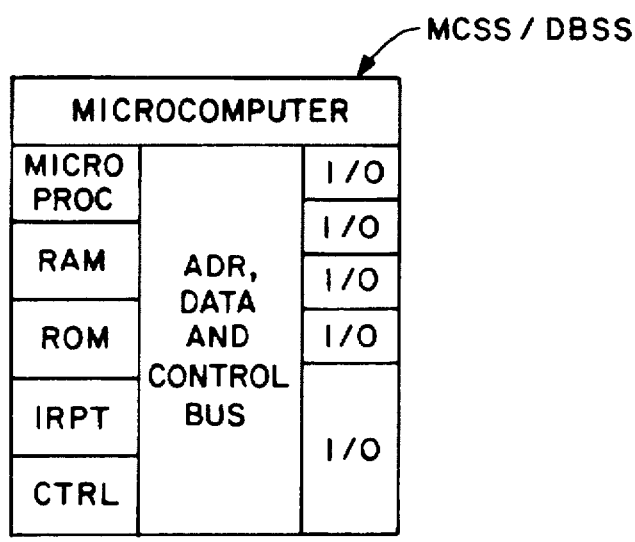
Figure 5:
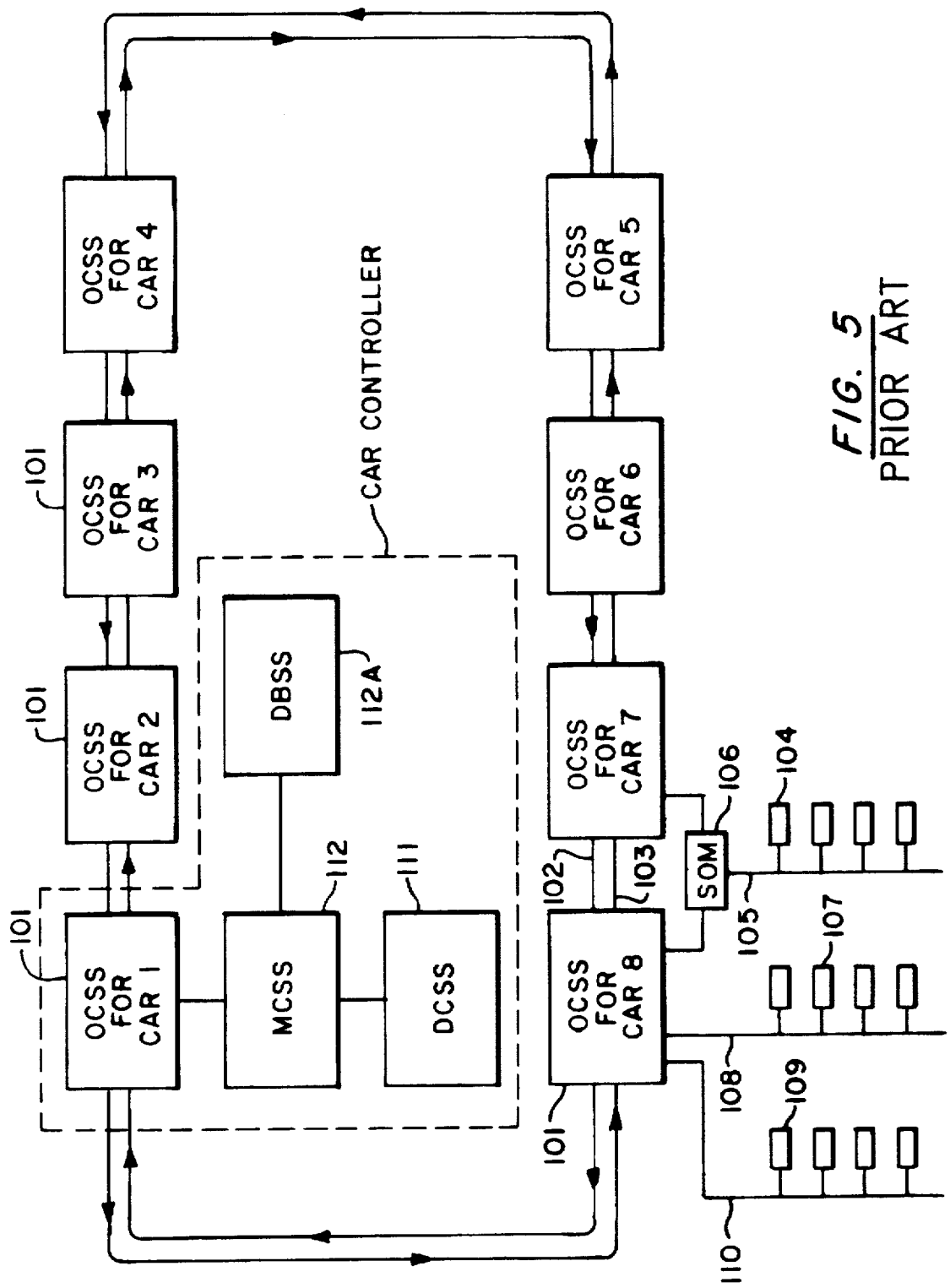

FIG. 5 is a block schematic diagram of a prior art control arrangement for an eight car elevator system, in which arrangement the present invention may be implemented. FIG. 5A is a block schematic diagram of an elevator motion control subsystem (MCSS) in which the software (i.e. instructions and all data) for the compensated signal generating means is stored and executed.

BEST MODE FOR CARRYING OUT THE INVENTION

Figures 1, 1A:
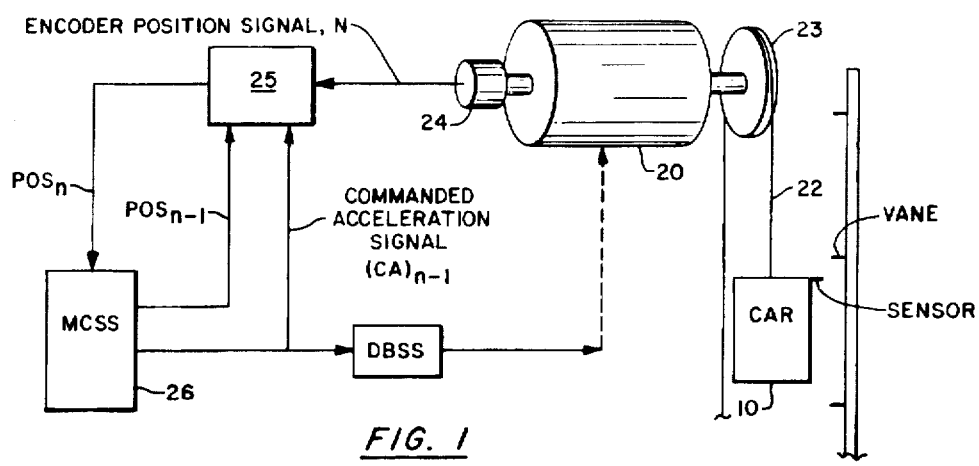
FIG. 1 is a block schematic diagram of the present invention.
FIG. 1A shows the mathematical equation for the compensated position reference function according to a preferred embodiment of the invention.

According to the present invention (FIG. 1), a compensation arrangement includes a compensated signal generator 25 which generates a compensated signal ($\text{POS}_n$) and is included, for example, within the MCSS to operate upon true encoder position signal$_n$ generated by the known encoder assembly 24. The generator 25 includes commercially available hardware and software forming the MCSS see FIG. 5A, and also includes suitable instructions and data corresponding to a compensated position reference function of the present invention as shown in FIG. 1A. In FIG. 1, the generator 25 is shown separated from the remainder of the MCSS to emphasize the closed-loop feedback arrangement for the signals: Position$_{n-1}$ and Commanded Acceleration$_{n-1}$. FIG. 5 shows an overall conventional control arrangement including an operational control subsystem (OCSS), door control subsystem (DCSS), motion control subsystem (MCSS) and drive and brake subsystem (DBSS), all suitably connected as shown. The MCSS controls car motion under the control of the OCSS, with the MCSS working in conjunction with the DBSS. See, e.g., U.S. Pat. Nos.: 5,168,136; 5,168,133; 5,202,540; 5,024,296; 4,751,984; and 4,497,391 which are incorporated herein by reference. Coding the instructions and data, and otherwise implementing the instant invention within, e.g., FIG. 5, is well within the skill of the art in view of the instant specification.

Figure 2:
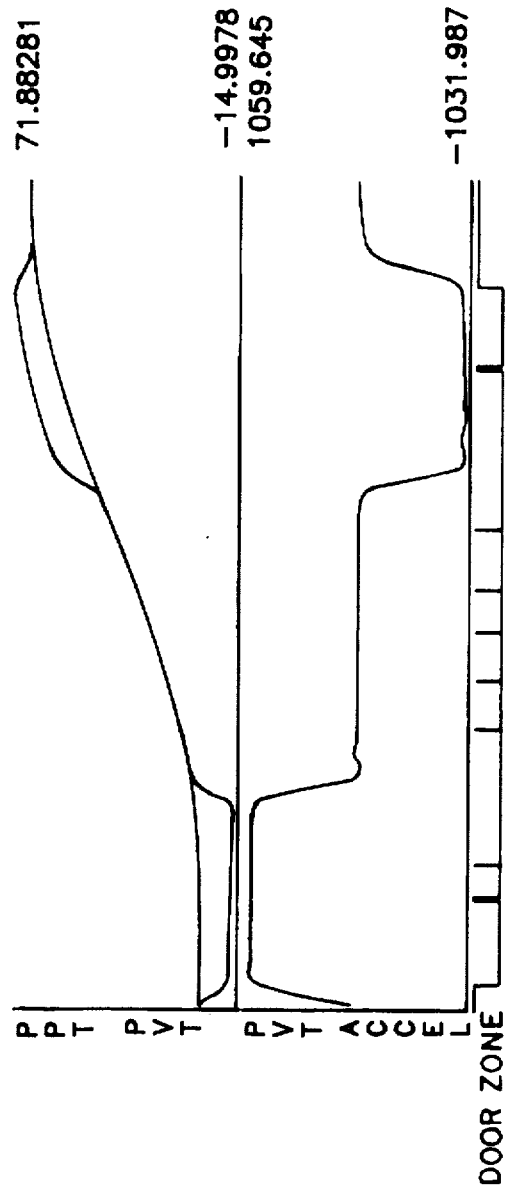
FIG. 2 is a graph showing an uncompensated difference characteristic.
Figure 3:
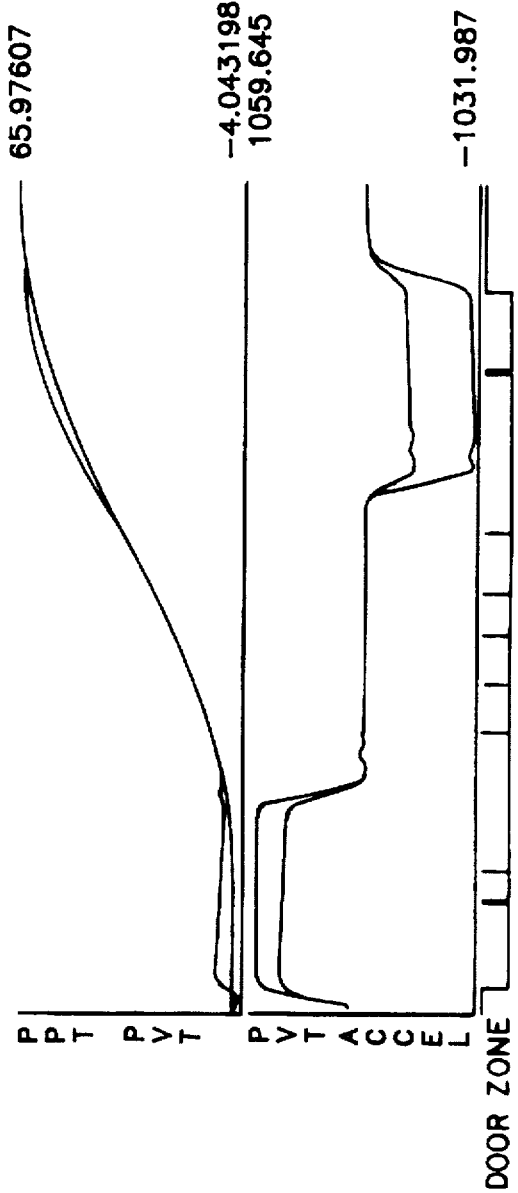
FIG. 3 is a graph showing a compensated difference characteristic.
Figure 4:
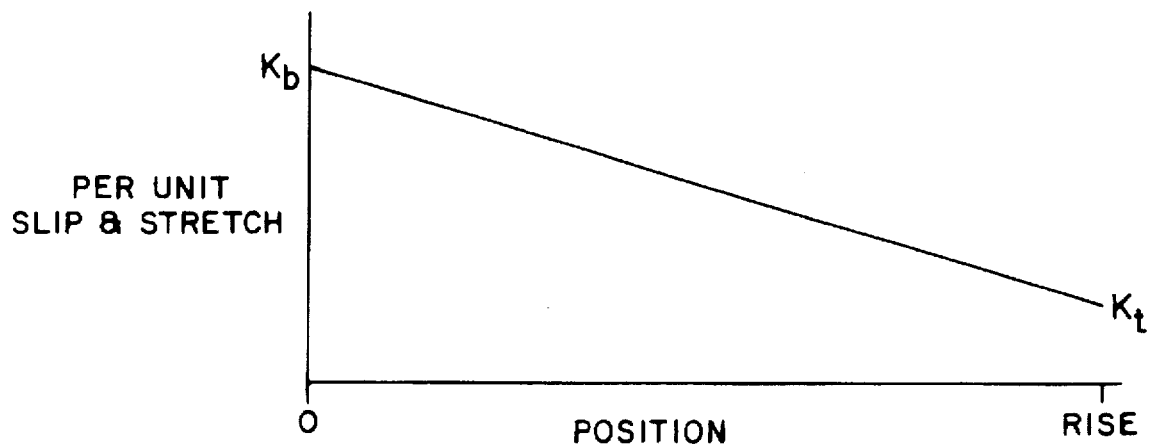
FIG. 4 is a graphical representation of the compensation factor, $$K_b + (\text{Position}_{n-1}) \left( \frac{K_t - K_b}{\text{Rise}} \right),$$

The effect of this compensation (i.e., utilization of the compensation position reference function) is shown graphically in FIGS. 2 and 3. Each graph shows, in its upper trace, the difference between a shaft encoder mechanically connected directly to the cab (e.g., via a steel tape) and a short encoder mounted on the shaft of the driving machine, superimposed on the learned static characteristic and, in the lower trace, the acceleration commanded at the driving machine shaft together with the compensation signal applied to correct for the dynamic effects (note that the dynamic component converges back to the static characteristic on its own). FIG. 2 shows these characteristics with no compensation applied, and FIG. 3 shows what occurs when the compensation signal is applied. Both graphs show where the discrete reference points would occur for the example, indicated by the DZ (door zone) trace at the bottom of each graph. It can be seen in FIG. 3, that the dynamic component is significantly reduced.

When the elevator system is under normal automatic positioning and a reference position point is detected in the hoistway, the encoder pulse count is aligned to be the value in the position reference table and the difference is erased. This causes a step change in the value of position used by the position control at that particular time. If this step is of sufficiently small magnitude, the position control will not deviate significantly from proper operation. However, for high rise applications, if this reference point is encountered during the acceleration operations of normal motion control, the driving machine shaft encoder pulse count will significantly differ from what it was during the learn process (as shown in FIG. 2). Erasing that difference at that time will cause a significant error to be assimilated into the position control system causing the position control to malfunction, if it were not to be compensated. This is usually manifested by the cab being physically misaligned with the target position when it comes to rest at the end of the run. However, if the pulse count (or true encoder position) is adjusted in accordance with the amount of predicted error due to dynamic "slip and stretch" according to the present invention, the control assimilates an error that is highly reduced in magnitude and the position control functions normally. It should be noted that, a theoretically ideal mode of compensation would also consider variations in slip and stretch resulting from the load present in the car, as well as, phasing error present in the compensation signal due to the use of the stimulus signal (e.g. commanded acceleration). An ideal compensator would be one that accounted for the complete transfer function of the control elements between the driving machine shaft and the cab itself. However, the method disclosed herein deems these error contributions manageable within normal position control.

The methodology of the invention significantly prevents the introduction of large errors into the position control system due to non-zero rates of imposed positive and negative acceleration, which can cause a degradation in positional controllability, and tends to neutralize the dynamic components of "slip and stretch" present in the position feedback signal mounted to the driving machine shaft. The compensated position reference function is defined:

$$\text{Position}_n = (\text{True Encoder Position})_n - (\text{Commanded Acceleration})_{n-1}$$
$$[((K_t - K_b)/\text{Rise})(\text{Position}_{n-1}) + K_b]$$

Where:

True Encoder Position$_n$=Current uncompensated/true position from driving machine shaft encoder (e.g., mm)

Position$_n$=Current position reference value based on driving machine encoder feedback used for position control (e.g., mm)

Position$_{n-1}$=Previous position reference value based on driving machine encoder feedback (mm).

Rise=Maximum value of Position (where minimum value of Position is zero) (mm). Commanded Acceleration$_{n-1}$= Acceleration most recently commanded by the motion controller to the drive system (meters/sec/sec)

$K_t$=Slip and Stretch per unit acceleration expected at the top of the hoistway $K_b$=Slip and Stretch per unit acceleration expected at the bottom of the hoistway NOTE: $K_t$ and $K_b$ are determined empirically for each particular elevator installation. For one exemplary installation, $K_t$ was 8 mm/m/s$^2$ and $K_b$ was 22 mm/m/s$^2$.

Although the invention has been shown and described with respect to a best mode embodiment thereof, it should be understood by those skilled in the art that various other changes, omissions and additions in the form and detail thereof may be made therein without departing from the spirit and scope of the invention.

What is claimed is:

1. An elevator car position compensation arrangement comprising:

a car coupled to a motor by means of ropes;

means for driving the motor;

uncompensated signal generating means for generating an uncompensated car position signal; and compensated signal generating means for generating a compensated car position signal, said compensated signal generating means including instructions and data for generating a car position signal according to the following relationship:

$$\text{Position}_n = (\text{True Encoder Position})_n - (\text{Commanded Acceleration})_{n-1}$$
$$[((K_1 - K_b)/\text{Rise})(\text{Position}_{n-1}) + K_b]$$

Where:

True Encoder Position$_n$=Current uncompensated/true position from driving machine shaft encoder (e.g., mm)

Position$_n$=Current position reference value based on driving machine encoder feedback used for position control (e.g., mm)

Position$_{n-1}$=Previous position reference value based on driving machine encoder feedback (e.g., mm).

Rise=Maximum value of Position (where minimum value of Position is zero) (e.g., mm).

Commanded Acceleration$_{n-1}$=Acceleration most recently commanded by the motion controller to the drive system (meters per second)

$K_1$=Slip and Stretch per unit acceleration expected at the top of the hoistway $K_b$=Slip and Stretch per unit acceleration expected at the bottom of the hoistway.

2. An arrangement as claimed in claim 1, wherein said driving means is a drive and brake subsystem.

* * * * *